Jan. 13, 1931.  R. CHILTON  1,789,169
GEAR TRAIN FOR STARTERS OR THE LIKE
Filed June 18, 1928
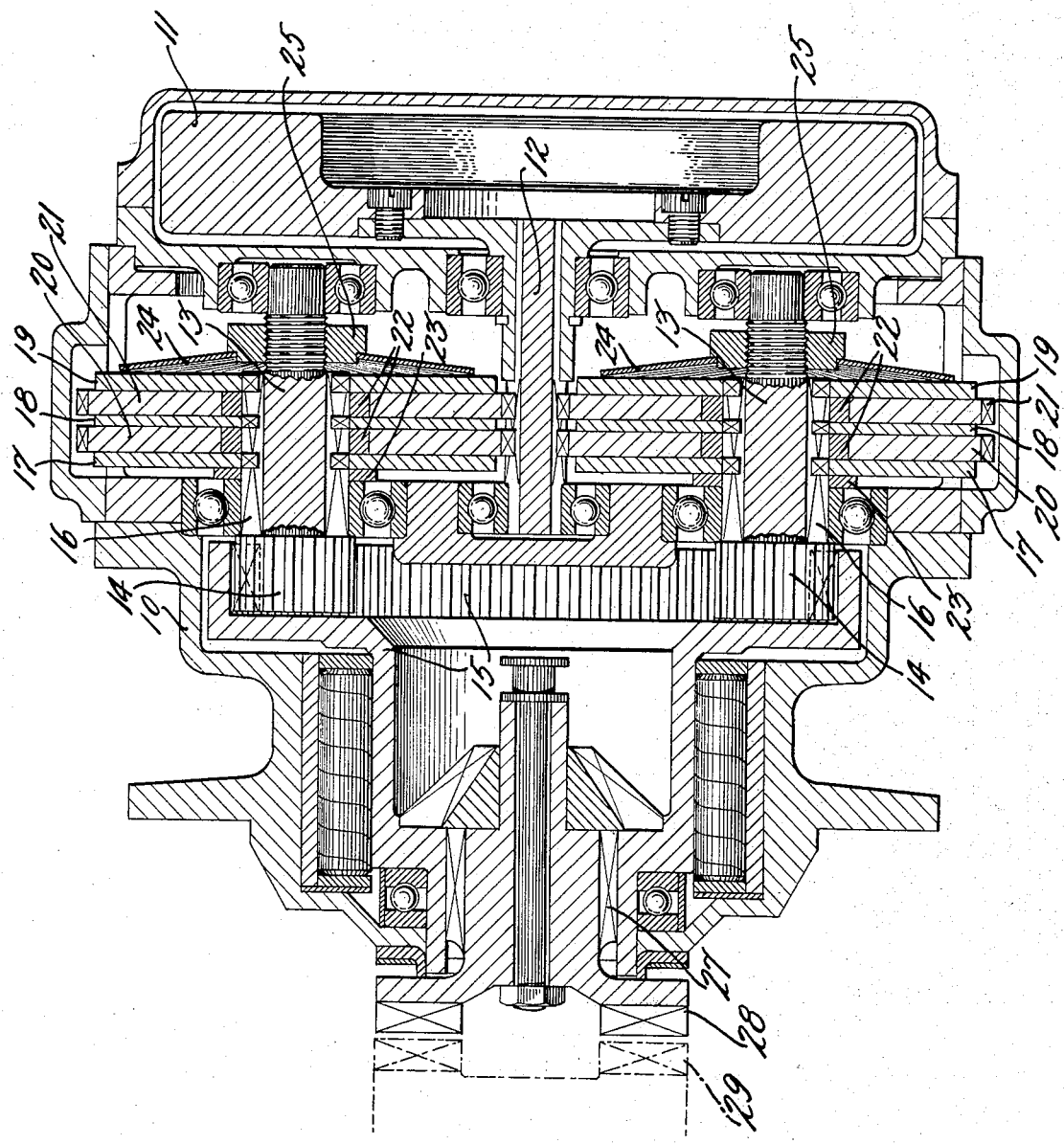
INVENTOR
Roland Chilton
BY
Verner J Rathermum
ATTORNEY Patented Jan. 13, 1931

1,789,169

UNITED STATES PATENT OFFICE

ROLAND CHILTON, OF KEYPORT, NEW JERSEY, ASSIGNOR, BY MESNE ASSIGNMENTS, TO ECLIPSE MACHINE COMPANY, OF ELMIRA HEIGHTS, NEW YORK, A CORPORATION OF NEW YORK

GEAR TRAIN FOR STARTERS OR THE LIKE

Application filed June 18, 1928. Serial No. 286,121.

This invention relates to gear trains for starters or the like which incorporate a load limiting clutch. One of the objects of this invention is to attain a relatively high gear ratio in a simple and compact gear train which will be economical in weight and cost of manufacture. The use of pinions having relatively few teeth is of great assistance in this direction but the small diameter pinions desired become relatively slender when adequate aggregate tooth width is provided and the distortions, which tend towards corner tooth contact and failure, make some form of compensating device to effect self-alignment desirable. This is provided in the present invention in an extremely simple manner by laminating certain of the gears to comprise a plurality of narrow units frictionally driven to permit each to automatically assume the proper position so as to take only its proportionate share of the driving load. The frictional driving means of these gear discs also comprise the load limiting clutch means which protects the entire mechanism and by this combination of function an extremely compact and simple structure is provided.

Bending moments on the relatively slender high speed pinion are eliminated by the use of a plurality of layshafts, two being indicated in the showing. It will be appreciated that, in such a double layshaft construction, rigid driving connections throughout would cause all the load to come on one set of the gears only if the angular relationships between the teeth are not accurately symmetrical. In fact, it is a common occurrence in gear trains of this character that, due to production errors in the bearing spacing or the layshaft pinion and gear tooth relationships the gears cannot even be assembled. By providing a clutch for each layshaft, all necessity for accurate angular relationship between the gear and pinion teeth is avoided, as each clutch may be tightened after the gears have been meshed, whereupon they will assume their natural positions and no tooth element can be loaded in service beyond the slipping point of the clutch means which drives it.

The objects of simplicity and economy of production are further achieved by disposing the layshaft gear units to comprise the driven clutch plates whereby a substantial reduction in the number of parts is obtained and each gear section is protected from overload due to distortion or inaccuracy in the parts which would tend to throw all the load on one end of a rigidly mounted gear, while this construction at the same time provides a preset load limiting clutch which determines the maximum driving load developed by or imposed on the entire mechanism.

Various other objects and advantages of the invention will be in part obvious from an inspection of the accompanying drawings and a careful consideration of the following particular description and claims of one form of mechanism embodying my invention.

The drawing is a longitudinal section of the preferred form of the present invention.

With reference to the drawing 10 designates the housing of an inertia type engine starter in which a flywheel 11 that is energizable to high speed from a source of power is mounted on a pinion shaft 12 in any suitable manner as by means of a splined hub. Laterally disposed of the pinion shaft are a plurality of lay shafts 13 provided with pinions 14 that mesh with an internal gear 15.

The lay shafts 13 are splined as at 16 said splines having conveniently been cut co-extensive with the teeth of the pinions 14, and in driving engagement with said lay shaft splines there are mounted a series of clutch plates 17, 18, 19 which alternate with the gear portions 20 and 21, said gear portions being drivably engaged with the pinion shaft 12 and mounted rotationally free upon the lay shafts 13 by means of the bushings 22.

Each of the lay shafts 13 is provided with a collar 23 which is adapted to prevent axial movement of the clutch plates and gear portions in that direction whilst frictional driving engagement between the clutch plates and gear portions is engendered by the disk springs 24 the tension of which can be varied by an adjusting nut 25. It will be readily understood that with a structure as above described, the gear portions 20 and 21 are free to automatically assume a position best suited for the proportional sharing of the driving load inasmuch as they are mounted upon the layshafts for rotation independently of each other to the extent of such distortion as may take place in the relatively slender pinion 12, and it is manifest that corner tooth contact will be obviated in a gear of substantial width if said gear is formed of a plurality of relatively narrow units as herein disclosed.

As referred to in the beginning, this assemblage of clutch plates and gear portions also provides a load limiting clutch for the mechanism since the clutch plates 17, 18 and 19 are frictionally driven from the gear portions by means of the friction producing pressure derived from the springs 24 which can be varied to suit the requirements. This arrangement permits of unlimited slippage between the parts which is desirable due to the enormous amount of energy stored in the high speed flywheel 11. Since the load limiting clutch may be adjusted to transmit a predetermined amount of torque only and this regardless of the resistance to rotation offered by the member to be driven by the flywheel, the parts of the starter may be made light and extremely compact, both of which features are highly desirable in starters for internal combustion engines.

The internal gear 15 is drivably connected by the splines 27 to a jaw clutch 28 which can be axially shifted by any suitable means into engagement with a means to be driven such as an engine shaft designated by 29.

There is thus provided a combination of elements which is very short in length, of small diameter, of light weight, and which is very symmetrical. These features are of importance in starters for internal combustion engines, as is pointed out in my patent referred to above.

Variations may be resorted to within the scope of the invention and portions of the improvements may be used without the others, whilst not departing from the spirit of the invention.

Having thus described my invention, I claim:—

1. In engine starting apparatus of the class described, the combination of a power member pinion, a main driven gear coaxial therewith, a plurality of layshafts each comprising a pinion meshed with said gear, and a laminated gear meshed with the power pinion, said laminations comprising the driven elements of a preset clutch drivably engaging the layshaft pinions.

2. In a starter, the combination of a power pinion, a high speed flywheel drivably connected to said pinion, an engine engaging means, a driven gear torsionally rigid with said means, a plurality of layshafts each comprising a pinion meshed with said gear, a plurality of gear disks meshed with said power pinion, a plurality of friction disks engaged with said gear disks and secured for rotation with said layshaft pinion, and means for adjusting the frictional engagement of said disks to secure a predetermined transfer of torque thereby.

3. In a starter, the combination of a high speed power pinion, a flywheel secured thereto, a plurality of layshafts each having rotatably mounted thereon a plurality of gear disks having teeth meshed with the power pinion, an internal driven gear, a longitudinally movable engine engaging member drivably connected to said gear, a pinion for each layshaft in mesh with said gear, driving clutch plates drivably secured upon the layshafts and frictionally engaging said gear disks and yielding means operatively associated with said plates and disks for predetermining the load or torque transmitted thereby.

4. In a starter, the combination of a longitudinally movable engine engaging member, a flywheel coaxial therewith, a clutch comprising a plurality of driving and driven plates frictionally engaged, a high speed power pinion drivably connected to the flywheel, a clutch pinion, each of said driving plates having teeth meshed with the high speed power pinion, each of said driven plates being engaged for unitary rotation with the clutch pinion, and an internal gear operatively connected to said engine engaging member and in meshing engagement with said clutch pinion.

5. A starter comprising in combination a high speed driving pinion, a flywheel drivably connected thereto, a low speed internal gear coaxial with the pinion, engine engaging means drivably connected to said low speed gear, a plurality of layshafts each comprising a gear and pinion meshed respectively with the high speed pinion and the low speed gear, each of said layshafts including a friction clutch having driving and driven sets of clutch plates, said driving set of clutch plates comprising the layshaft gears, and means for predetermining the torque to be transmitted by said friction clutch.

6. In an inertia starter of the class described, in combination, a laminated gear and clutch unit comprising, a shaft, a first set of clutch plates mounted for rotation with the shaft, a second set of clutch plates in alternated frictional contact between the first set of plates, means for rotatably mounting said second set of plates on said shaft, gear teeth on said second set of plates, a spring means frictionally loading all the plates, the whole adapted for slippage of all or any one of the gear plates for the avoidance of excessive tooth loads and to transmit a predetermined load.

7. In apparatus of the class described, in combination, a high speed pinion, a flywheel secured thereto, a low speed internal gear coaxial with the pinion, an engine engaging member adapted to be driven by said internal gear, a plurality of layshafts each comprising a pinion meshed with the low speed gear and a plurality of gear elements each meshed with the high speed pinion and friction clutch means between said pinion and gear elements adapted for the slippage thereof independently or in unison and also adapted to transmit a predetermined load.

8. In engine starting mechanism, the combination of a high speed pinion and a low speed internal gear in co-axial alignment, back gears comprising a driving connection therebetween and each including a plurality of gear disks, friction means, and resilient means for yieldingly driving each disk, said resilient means being adjustable to provide for the transfer of a predetermined amount of torque by said disks and friction means.

9. In engine starting mechanism, a gear comprising a plurality of lamina, a plurality of friction disks alternating with said lamina, a drive shaft disposed axially of said disks and drivably engaging the same, the gear lamina being mounted for free rotation about said shaft, an internal gear adapted to be driven from said shaft and pressure means adapted to produce a predetermined frictional driving engagement between said lamina and disks.

10. In engine starting mechanism, a gear comprising a plurality of lamina, a plurality of friction disks alternating with said lamina, a drive shaft disposed axially of said disks and drivably engaging the same, the gear lamina being mounted for free rotation on said shaft, an internal gear drivably connected to said shaft, and adjustable pressure means adapted to produce a predetermined frictional driving engagement between said lamina and friction disks for unitary rotation and to permit relative rotation therebetween when the driving load exceeds that for which the pressure means has been set.

11. In an inertia starter for internal combustion engines, a high speed flywheel, a longitudinally movable engine engaging member adapted to be driven by said flywheel and means for drivably connecting said flywheel and engine engaging member including an internal gear connected to the engine engaging member, a pair of diametrically disposed pinions meshing with said internal gear, a pinion shaft drivably connected with the flywheel and disposed coaxially of the engine engaging member, and means including a pair of clutches adapted to transmit a predetermined torque for drivably connecting said pinions and pinion shaft.

12. In an engine starter of the inertia type, means for storing energy at a high velocity, means to be driven by the first named means coaxial therewith, and a driving means between the first and second named means comprising a plurality of layshafts in driven connection at one end with the first named means and in driving connection at the other end with the second named means.

13. In an engine starter of the inertia type, a drive shaft, a flywheel mounted on the shaft at one end, a pinion mounted on the shaft at the other end, a driven gear concentric with the axis of the shaft, and means for transmitting the motion of the flywheel to the gear including layshafts having gears and pinions in driving connection respectively with the drive shaft pinion and the driven gear, the layshafts being located in a plane with the axis of the drive shaft and driven gear, but on opposite sides thereof to equalize the bending moment of the flywheel shaft or driven gear due to torque.

14. In an engine starter of the inertia type, a drive shaft, a flywheel mounted on the shaft at one end, a pinion mounted on the shaft at the other end, a driven gear concentric with the axis of the shaft, engine engaging means actuated by the gear, and means for transmitting the motion of the flywheel to the gear including layshafts having gears and pinions in driving connection respectively with the drive shaft pinion and the driven gear, the layshafts being located in a plane with the axis of the drive shaft and driven gear, but on opposite sides thereof to equalize the bending moment of the flywheel shaft or driven gear due to torque.

15. In an engine starter of the inertia type, means for storing energy at a high velocity, means to be driven by the first named means coaxial therewith, and a friction clutch driving means between the first and second named means comprising a plurality of layshafts having at one end in alternate relation, friction disks rotationally rigid therewith, and laminated gear sections rotationally free therewith but in driving relation with the first named means, the layshafts at their other end having splined pinions in driving relation with the second named means.

16. In an engine starter of the inertia type, means for storing energy at a high velocity, means to be driven by the first named means coaxial therewith, and a friction clutch driving means between the first and second named means comprising a plurality of layshafts having at one end in alternate relation friction discs rotationally rigid therewith, and laminated gear sections rotationally free therewith but in driving relation with the first named means, the layshafts at their other end having splined pinions in driving relation with the second named means, said layshafts being located in a plane with the axis of the first and second named means but on opposite sides thereof to equalize the bending moment of the first and second named means due to torque.

17. In an engine starter of the inertia type, a flywheel, a gear coaxial therewith, and a friction clutch driving means for transmitting the energy of the flywheel to the gear comprising a plurality of layshafts having at one end in alternate relation friction disks rotationally rigid therewith and laminated gear sections rotationally free therewith but in driving relation with the flywheel, the layshafts at their other ends having splined pinions in driving relation with the gear, and adjustable spring means for fixing the frictional engagement between the friction disks and the laminated gear sections.

18. In an engine starter of the inertia type, a drive shaft, a flywheel mounted on the shaft at one end, a pinion on the shaft at the other end, a driven internal gear coaxial with the drive shaft, an engine engaging means actuated by the driven gear, and a friction clutch driving means for transmitting the energy of the flywheel to the driven gear including a plurality of layshafts having at one end in alternate relation friction disks rotationally rigid therewith and laminated gear sections rotationally free therewith but in driving relation with the flywheel, the layshafts at their other ends having splined pinions in driving relation with the driven internal gear, the layshafts being located on opposite sides of the drive shaft to equalize the bending moment of the flywheel shaft or driven gear due to torque, and adjustable spring means on the layshafts for fixing the frictional engagement between the friction disks and the laminated gear sections.

19. In an inertia starter for internal combustion engines a high speed flywheel, an engine engaging member adapted to be driven at low speed by said flywheel and means for drivably connecting the flywheel and engine engaging member including two similar transmitting means each constituting a torque path and each adapted to transmit substantially equal amounts of torque from the flywheel to the engine engaging member.

20. In an inertia starter for internal combustion engines, a high speed flywheel, an engine engaging member adapted to be driven at low speed by said flywheel and means for drivably connecting the flywheel and engine engaging member including two similar gear trains having speed equalization means therein.

Signed at Keyport, in the county of Monmouth, and State of New Jersey, this 14th day of June, 1928.

ROLAND CHILTON.